United States Patent [19]
Dick

[11] Patent Number: 5,660,346
[45] Date of Patent: Aug. 26, 1997

[54] SEAT BELT RETRACTOR

[75] Inventor: Joseph G. Dick, Macomb, Mich.

[73] Assignee: TRW Vehicle Safety Systems Inc., Lyndhurst, Ohio

[21] Appl. No.: 580,079

[22] Filed: Dec. 20, 1995

[51] Int. Cl.[6] .............................. B60R 22/40; B60R 22/42
[52] U.S. Cl. .................... 242/376.1; 242/379.1; 242/381.1; 242/382.6; 242/384.6
[58] Field of Search .............................. 242/379.1, 376.1, 242/381.1, 381.4, 382.6, 383–384.6; 280/806; 297/478, 480

[56] References Cited

U.S. PATENT DOCUMENTS

| | | |
|---|---|---|
| 3,237,879 | 3/1966 | Wittingham . |
| 3,941,330 | 3/1976 | Ulrich . |
| 4,253,621 | 3/1981 | Seel ................................. 242/384.6 |
| 4,437,623 | 3/1984 | Wyder ............................. 242/381.1 |
| 4,844,375 | 7/1989 | Ballet ............................. 242/382.6 |
| 5,029,769 | 7/1991 | Fohl . |
| 5,050,815 | 9/1991 | Doty et al. . |
| 5,242,213 | 9/1993 | Fohl . |

*Primary Examiner*—John M. Jillions
*Attorney, Agent, or Firm*—Tarolli, Sundheim, Covell, Tummino & Szabo

[57] ABSTRACT

A vehicle seat belt retractor (10) includes a spool (170) on which seat belt webbing (16) is wound. The spool (170) is supported for rotation on hubs (102, 162). In the event a primary belt locking mechanism (270) fails to block withdrawal of belt webbing (16) from the retractor (10) in a vehicle emergency situation, the spool (170) moves into engagement with a series of fixed teeth (60, 70) on the retractor frame (40) to block rotation of the spool in the belt withdrawal direction (192). Barbs (130, 168) on the hubs (102, 162) cooperate with blocking members (120, 166) to maintain the spool (170) in its blocked condition after termination of the emergency situation.

17 Claims, 6 Drawing Sheets

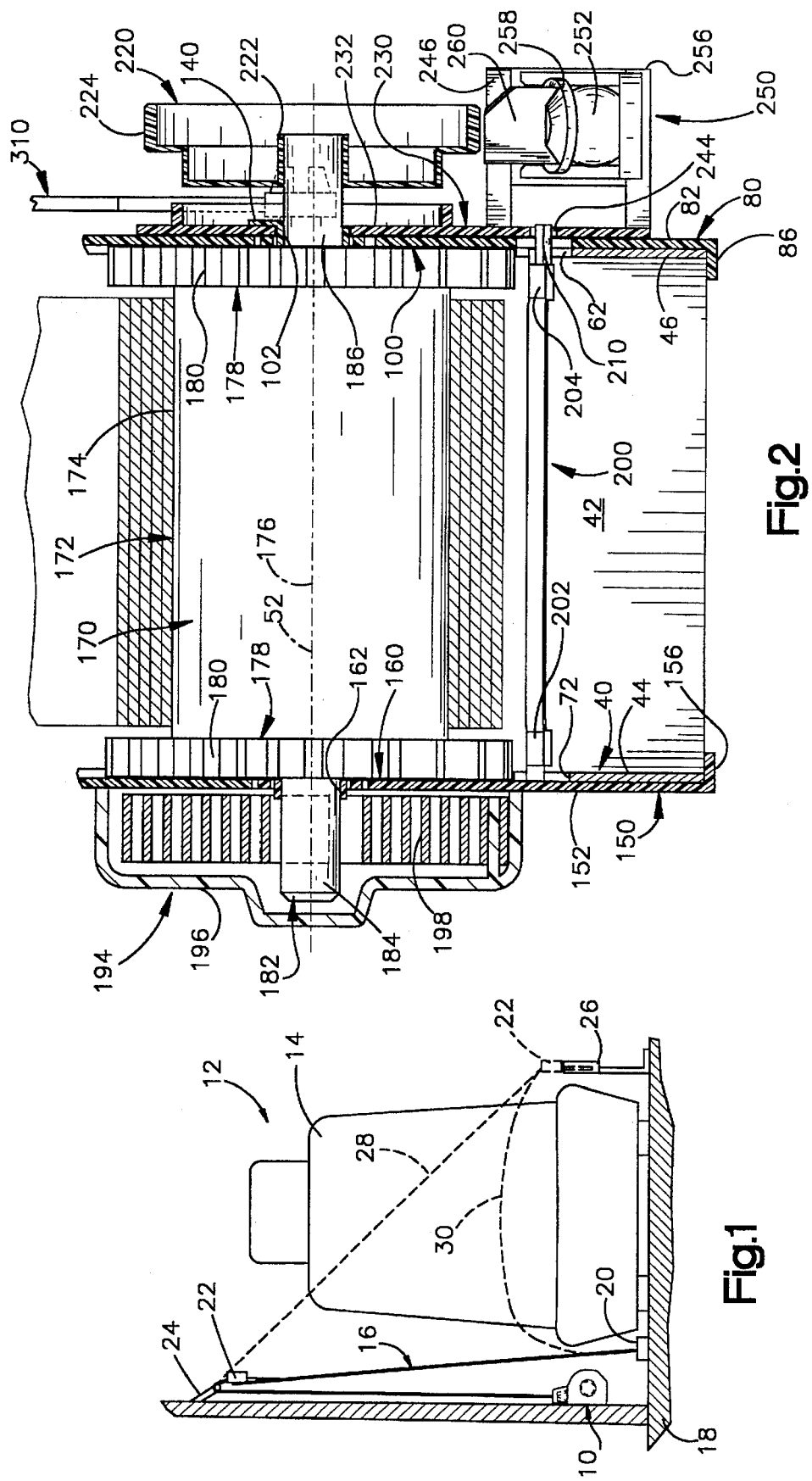

SEAT BELT RETRACTOR

BACKGROUND OF THE INVENTION

1. Technical Field

The present invention relates to a vehicle seat belt webbing retractor, and, in particular, to a retractor including a primary belt locking mechanism for blocking withdrawal of belt webbing from the retractor and a secondary belt locking mechanism which is actuatable in the event the primary belt locking mechanism does not block withdrawal of belt webbing from the retractor.

2. Description of the Prior Art

A known seat belt system to restrain a vehicle occupant includes a length of belt webbing wound on a spool of a seat belt webbing retractor. The belt webbing is extensible about a vehicle occupant to restrain the occupant. The retractor includes a belt webbing clamp mechanism which is actuatable, in the event of a vehicle emergency, to block withdrawal of belt webbing from the retractor. If the belt webbing clamp mechanism does not block withdrawal of the belt webbing from the retractor, the spool shifts radially, and ratchet teeth on the spool engage a member on the retractor to block further rotation of the spool. After termination of the vehicle emergency, the spool shifts back to its original position and is thereafter rotatable as it was before the vehicle emergency. It would be desirable to know when this shifting of the spool has occurred so that the retractor can be checked for damage.

SUMMARY OF THE INVENTION

The present invention is an apparatus comprising a seat belt retractor comprising a length of seat belt webbing which is extensible about a vehicle occupant to restrain the vehicle occupant. A spool on which the belt webbing is wound is rotatable in a belt retraction direction and in an opposite belt withdrawal direction. The retractor includes sensing means for sensing a vehicle emergency situation and a primary belt locking mechanism for blocking withdrawal of belt webbing from the spool in response to the sensing means sensing an emergency situation. A secondary belt locking mechanism has an actuated condition for blocking withdrawal of belt webbing from the spool and has an unactuated condition. The secondary belt locking mechanism is actuated in the event of inability of the primary belt locking mechanism to block withdrawal of the belt webbing from the spool. The retractor includes means for retaining the secondary belt locking mechanism in the actuated condition after termination of the emergency situation.

BRIEF DESCRIPTION OF THE DRAWINGS

Further features of the present invention will become apparent to those skilled in the art to which the present invention relates from reading the following specification with reference to the accompanying drawings, in which:

FIG. 1 is a schematic illustration of a vehicle seat belt system including a seat belt webbing retractor in accordance with the present invention;

FIG. 2 is a longitudinal view partially in section of portions of retractor of FIG. 1;

DESCRIPTION OF PREFERRED EMBODIMENTS

Figure 3:
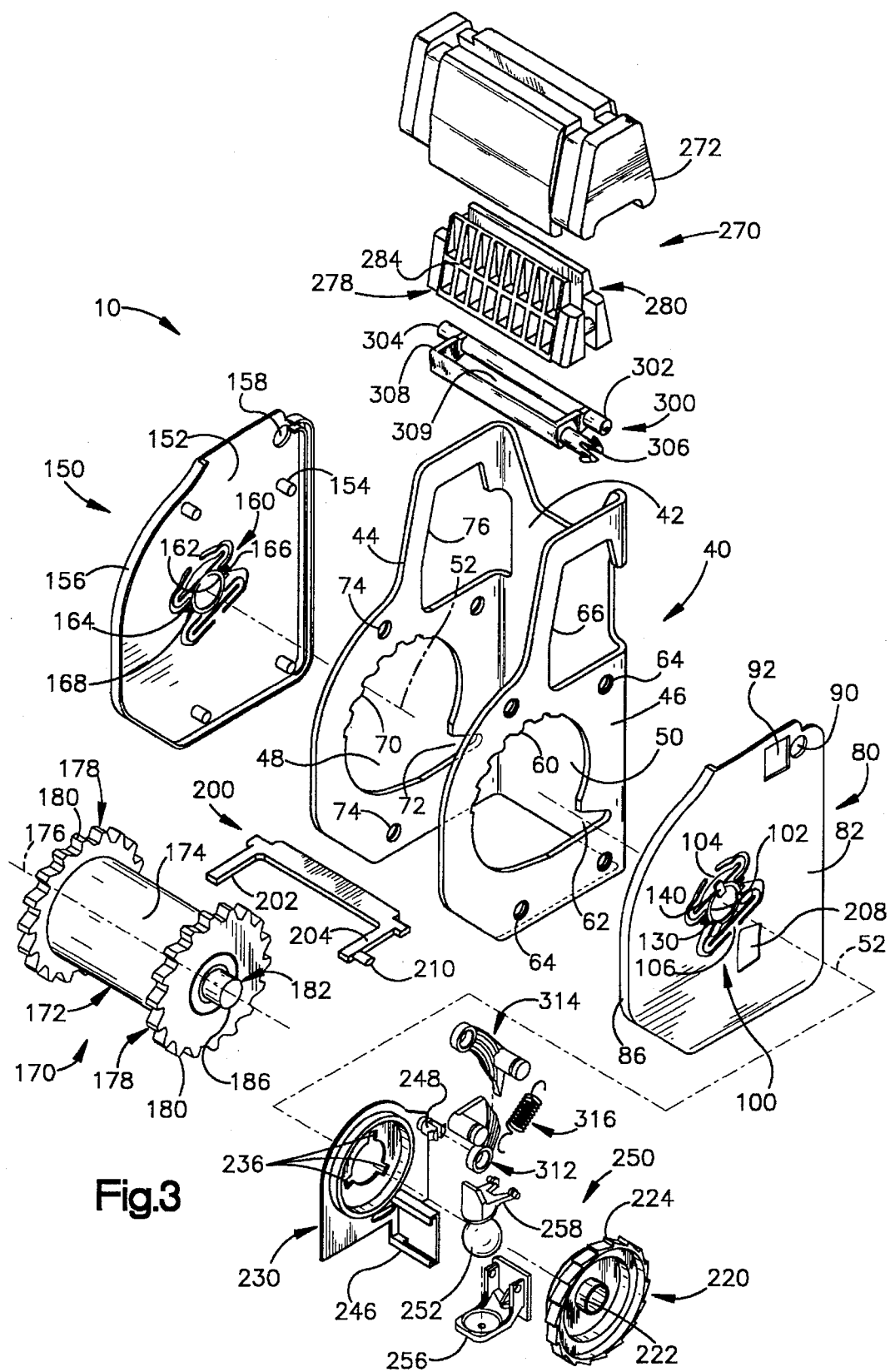
FIG. 3 is an exploded perspective view of the retractor of FIG. 1 with parts removed.

The present invention relates to a vehicle seat belt webbing retractor, and, in particular, to a retractor including a secondary belt locking mechanism which is actuatable in the event that a primary belt locking mechanism does not block withdrawal of belt webbing from the retractor. The present invention is applicable to various retractor constructions. As representative of the present invention, FIG. 1 illustrates a seat belt webbing retractor 10. The retractor 10 is incorporated in a three-point continuous loop seat belt system 12 for use in restraining an occupant of a vehicle.

During operation of the vehicle, the occupant of the vehicle sits on a seat 14 which is illustrated as a front passenger seat in the vehicle. A length of belt webbing 16 is extensible about the vehicle occupant. One end of the length of belt webbing 16 is anchored to the vehicle body 18 at an anchor point 20 located on one side of the seat 14. The opposite end of the belt webbing 16 is attached to the retractor 10 which is secured to the vehicle body on the same side of the seat 14. Intermediate its ends, the belt webbing 16 passes through a tongue assembly 22 and a D-ring 24 that is located above the retractor 10 and the anchor point 20. When the seat belt system 12 is not in use, the belt webbing 16 is wound on the retractor 10 and is oriented generally vertically on the one side of the seat 14, as shown in solid lines in FIG. 1.

To engage the seat belt system 12, the tongue assembly 22 is manually grasped and is pulled across the lap and torso of the occupant sitting in the seat 14. As the tongue assembly 22 is pulled across the lap and torso of the occupant, the tongue assembly moves along the belt webbing 16, and the belt webbing is unwound from the retractor 10. When the belt webbing 16 has been pulled across the lap and torso of the occupant, the tongue assembly 22 is connected with a buckle 26, as shown in dashed lines in FIG. 1. The buckle 26 is connected to the vehicle body 18 and is disposed on the side of the seat 14 opposite the anchor point 20. When the seat belt system 12 is thus buckled, the length 6f belt webbing 16 is divided by the tongue assembly 22 into a torso portion 28 which extends across the torso of the occupant and a lap portion 30 which extends across the lap of the occupant.

The retractor 10 (FIGS. 2 and 3) includes a frame 40 which is fixed to the vehicle body 18 in a manner not shown. The frame 40 is a single piece of sheet metal stamped and formed to a U-shaped configuration as best seen in FIG. 3. The frame 40 includes a back wall 42 and spaced parallel side walls 44 and 46 which extend generally perpendicular to the back wall.

A generally circular opening 48 is formed in one frame side wall 44. A generally circular opening 50, identical to the opening 48, is formed in the opposite frame side wall 46. The openings 48 and 50 are centered on a primary axis 52 of the retractor 10. The primary axis 52 extends between the frame side walls 44 and 46 in a direction parallel to the frame back wall 42.

A series of fixed teeth 60 are formed on one sector of the outer periphery of the opening 50 in the frame side wall 46. The fixed teeth 60 are disposed at a location generally above and outward of (to the left as viewed in FIG. 7) the primary axis 52. A wedge-shaped lock pawl opening 62 is formed on the outer periphery of the circular opening 50 in the frame side wall 46. The lock pawl opening 62 is disposed at a location generally below and inward of (to the right as viewed in FIG. 7) the primary axis 52. The lock pawl opening 62 is approximately diametrically opposite the fixed teeth 60. Four sensor plate support openings 64 are formed in the one frame side wall 46. The upper portion of the frame side wall 46 also includes an opening 66 for receiving parts of a belt webbing clamp mechanism 270 described below.

The other frame side wall 44 is a mirror image of the one side wall 46. The frame side wall 44 includes a series of fixed teeth 70 on the outer periphery of the opening 48. The frame side wall 44 also includes a wedge-shaped lock pawl opening 72 on the outer periphery of the opening 48. Four spring plate support openings 74 are formed in the frame side wall 44. The upper portion of the side wall 44 includes a belt webbing clamp mechanism opening 76.

A sensor plate 80 (FIGS. 3, 7–10) is fixed to the frame side wall 46. The sensor plate 80 is made from one piece of molded plastic and includes a planar main wall portion 82 disposed in abutting engagement with the frame side wall 46. Four support pins (not shown) extend from the main wall portion 82 into the support pin openings 64 in the frame side wall 46. The support pins secure the sensor plate 80 in position on the side wall 46 of the frame 40. An outer peripheral rim 86 of the sensor plate 80 projects axially from the main wall portion 82 in a direction toward the opposite side wall 44 of the frame 40. The rim 86 wraps around the lower portion of the side wall 46 of the frame 40.

The sensor plate 80 includes an initiator pivot pin opening 90 which overlies the clamp mechanism opening 66 in the frame side wall 46. An initiator link post opening 92 in the sensor plate 80 also overlies the clamp mechanism opening 66 in the frame side wall 46. A lock pawl opening 208 is disposed near the bottom of the sensor plate 80.

The sensor plate 80 includes a bearing section 100 (best seen in FIGS. 7 and 9) which includes a cylindrical hub 102. The hub 102 is normally centered on the primary axis 52 of the retractor 10. An oval or oblong upper arm portion 104 and an oval or oblong lower arm portion 106 of the bearing section 100 of the sensor plate 80 connect the hub 102 with the main wall portion 82 of the sensor plate. The upper arm portion 104 and the lower arm portion 106 both have oval or oblong central openings, are flexible, and support the hub 102 for limited movement, relative to the main wall portion 82 and the primary axis 52, in a first direction indicated by the arrow 110 in FIG. 9 and in an opposite second direction 112. A pair of frangible connector portions 114 of the sensor plate 80 also connect the hub 102 with the main wall portion 82 of the sensor plate. The connector portions 114 extend generally radially outward from the hub 102, in a direction generally perpendicular to the first direction 110.

The bearing section 100 of the sensor plate 80 includes a pair of blocking members 120 which are disposed radially outward of the hub 102. The blocking members 120 project radially inward from the main wall portion 82 in a direction toward the hub 102. Each blocking member 120 has a radially extending blocking surface 122 which is presented in the first direction 110. A cam surface 124 is formed on the opposite side of each blocking member 120 from the blocking surface 122 and extends at an acute angle to the associated blocking surface.

The bearing section 100 of the sensor plate 80 also includes a pair of barbs 130 which are connected for movement with the hub 102. The barbs 130 project radially outward from the hub 102. Each barb 130 is associated with an adjacent blocking member 120. Each barb 130 has a cam surface 132 which extends generally parallel to and which is presented toward the cam surface 124 on the associated blocking member 120. Each barb 130 also has a blocking surface 134 which is presented in the second direction 112. The blocking surfaces 134 extend generally parallel to the blocking surfaces 122 on the blocking members 120.

The sensor plate 80 further includes three assembly tabs 140 (FIG. 7) which project radially outward from the hub 102 in a direction parallel to the plane of the main wall portion 82 of the sensor plate. The assembly tabs 140 are spaced apart from the main wall portion 82 of the sensor plate 80 in a direction away from the side wall 46 of the frame 40, as can be seen in FIG. 2.

The retractor 10 includes a spring plate 150 (FIGS. 2 and 3) which is substantially a mirror image of the sensor plate 80. The spring plate 150 is a one-piece plastic molding and includes a planar main wall portion 152 disposed in abutting engagement with the frame side wall 44. Four support pins 154 on the main wall portion 152 of the spring plate 150 extend into the openings 74 in the frame side wall 44 to secure the spring plate on the frame side wall. An outer peripheral rim 156 of the spring plate 150 projects axially from the main wall portion 152 in a direction toward the opposite side wall 46 of the frame 40. A circular initiator pivot pin opening 158 overlies the clamp mechanism opening 76 in the frame side wall 44.

The spring plate 150 includes a bearing section 160 which includes a cylindrical hub 162. The hub 162 is normally centered on the primary axis 52 of the retractor 10. The hub 162, like the hub 102 on the sensor plate 80, is supported by upper and lower arm portions for movement, relative to the primary axis 52, in the first and second directions 110 and 112. A pair of frangible connector portions 164 of the spring plate 80 connect the hub 162 with the main wall portion 152 of the spring plate 150. The bearing section 160 of the spring plate 150 also includes a pair of blocking members 166 which are identical to the blocking members 120 on the sensor plate 80, and a pair of barbs 168 which are connected for movement with the hub 162 and which are identical to the barbs 130 on the sensor plate.

The retractor 10 includes a spool 170 (FIGS. 2 and 3). The spool 170 includes a reel 172 on which the belt webbing 16 is wound. The reel 172 has a cylindrical outer surface 174 centered on a spool axis 176. The spool axis 176 is normally coincident with the primary axis 52 of the retractor 10. The spool axis 176 is movable relative to the primary axis 52, with the hubs 102 and 162, in a manner described below. A pair of spool locking ratchet wheels 178 are disposed at opposite ends of the reel 172 and are fixed for rotation with the reel. A plurality of ratchet teeth 180 are disposed in a circular array on the outer periphery of each spool locking ratchet wheel 178.

The spool 170 also includes a cylindrical metal shaft 182 (FIGS. 2 and 3) which is fixed for rotation with the reel 172. A first end portion 184 (FIG. 2) of the shaft 182 projects axially from the left end (as viewed in FIG. 2) of the reel 172. The first end portion 184 of the shaft 182 is journalled for rotation in the hub 162 of the spring plate 150. A second end portion 186 (FIGS. 2 and 3) of the shaft 182 projects axially from the right end (as viewed in FIG. 2) of the reel 172. The second end portion 186 of the shaft 182 is journalled for rotation in the hub 102 of the sensor plate 80. The reel 172 and the shaft 182 are thereby supported on the hubs 102 and 162 for rotation about the primary axis 52, relative to the frame 40, in a belt retraction direction 190 (FIG. 5) and in an opposite belt withdrawal direction 192.

A rewind spring mechanism 194 (FIG. 2) is disposed on the side of the frame side wall 44 opposite the reel 172. The rewind spring mechanism 194 includes a cover 196 fixed to the frame 40. A spring 198 is connected between the cover 196 and the first end portion 184 of the shaft 182. The spring 198 biases the spool 170 for rotation in the belt retraction direction 190.

A lock pawl 200 (FIG. 3) is disposed adjacent to the spool locking ratchet wheels 178. The lock pawl 200 is preferably made from metal and includes at its opposite ends a pair of locking arms 202 and 204. The lock pawl 200 extends through the lock pawl openings 72 and 62 in the frame 40 and is supported on the frame 40 for pivotal movement relative to the frame. A cam tab 210 of the lock pawl 200 extends axially outward from the one locking arm 204 through the lock pawl opening 208 in the sensor plate 80 in a direction away from the frame 40.

A clutch support or pilot ratchet 220 is fixed for rotation with the spool 170. The pilot ratchet 220 includes a hub portion 222 (FIG. 2) secured to the second end portion 186 of the shaft 182. A plurality of pilot ratchet teeth 224 are disposed in a circular array on the outer periphery of the pilot ratchet 220.

Figure 4:
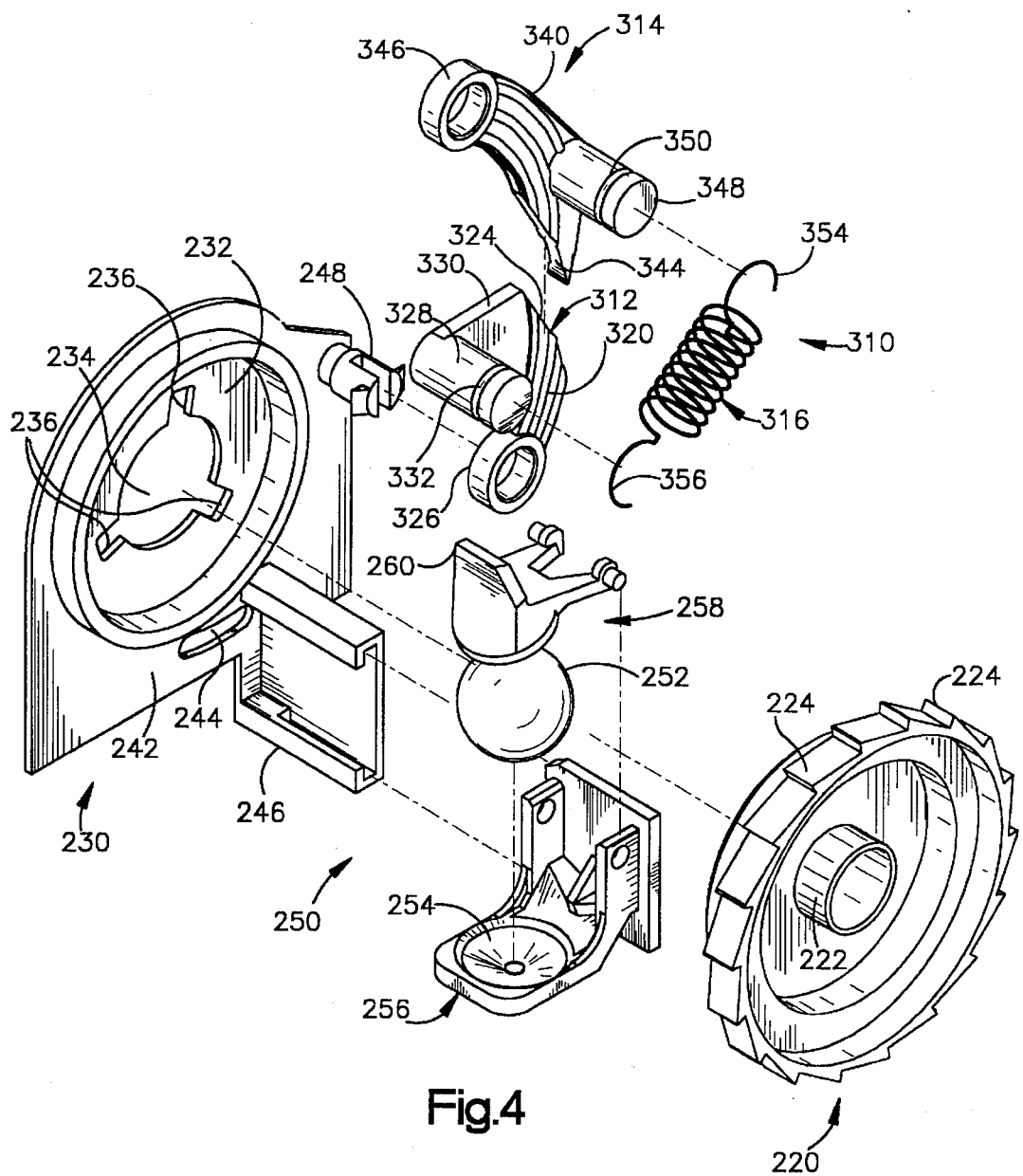
FIG. 4 is an enlarged view of a portion of FIG. 3.

An actuator 230 (FIGS. 2–4) is supported on the hub 102 of the sensor plate 80 for limited rotation relative to the frame 40 about the primary axis 52. A return spring (not shown) acting between the actuator 230 and the sensor plate 80 biases the actuator against rotation in the belt withdrawal direction 192. The actuator 230 has a radially extending disk portion 232 which defines a circular central opening 234 of the actuator.

Three assembly slots 236 extend radially outward from the central opening 234. The assembly tabs 140 on the sensor plate 80 are, during assembly of the retractor 10, inserted through the assembly slots 236 in the actuator 230. The actuator 230 is then rotated relative to the sensor plate 80 to the position shown in FIG. 5. The assembly tabs 140 hold the actuator 230 in position against the sensor plate 80.

The actuator 230 has a cam portion 242 that extends radially outward from the disk portion 232. A cam slot 244 extends through the cam portion 242 of the actuator 230. The cam slot 244 receives the cam tab 210 of the lock pawl 200.

A sensor support plate 246 projects axially from the actuator 230 adjacent the cam slot 244 in a direction away from the frame 40. The sensor support plate 246 is fixed for rotation with the actuator 230 about the primary axis 52 of the retractor 10. The actuator 230 also includes a lower link arm pivot post 248 which projects axially from an upper portion of the actuator in a direction away from the frame 40. The lower link arm pivot post 248 is fixed for rotation with the actuator 230, relative to the frame 40, about the primary axis 52.

The retractor 10 includes a vehicle deceleration sensing assembly 250 (FIGS. 3–6) for sensing sudden vehicle deceleration such as occurs in a vehicle collision. The vehicle deceleration sensing assembly 250 includes an inertia mass 252, which is preferably a steel ball. The inertia mass 252 rests in a cavity 254 in a sensor housing 256. The sensor housing 256 is supported on the sensor support plate 246 of the actuator 230.

A sensor lever 258 is mounted on the sensor housing 256 for pivotal movement relative to the sensor housing. The sensor lever 258 rests upon the inertia mass 252 and has a tooth 260 which extends upward and radially in a direction toward the pilot ratchet teeth 224 on the pilot ratchet 220. The tooth 260 on the sensor lever 258 is disposed axially coincident with (i.e., lies in the same plane as) the pilot ratchet teeth 224 on the pilot ratchet 220. The sensor lever 258 normally is disposed, under the influence of gravity, in a position in which the tooth 260 is spaced downward from and radially outward from the pilot ratchet teeth 224 on the pilot ratchet 220.

Figure 5:
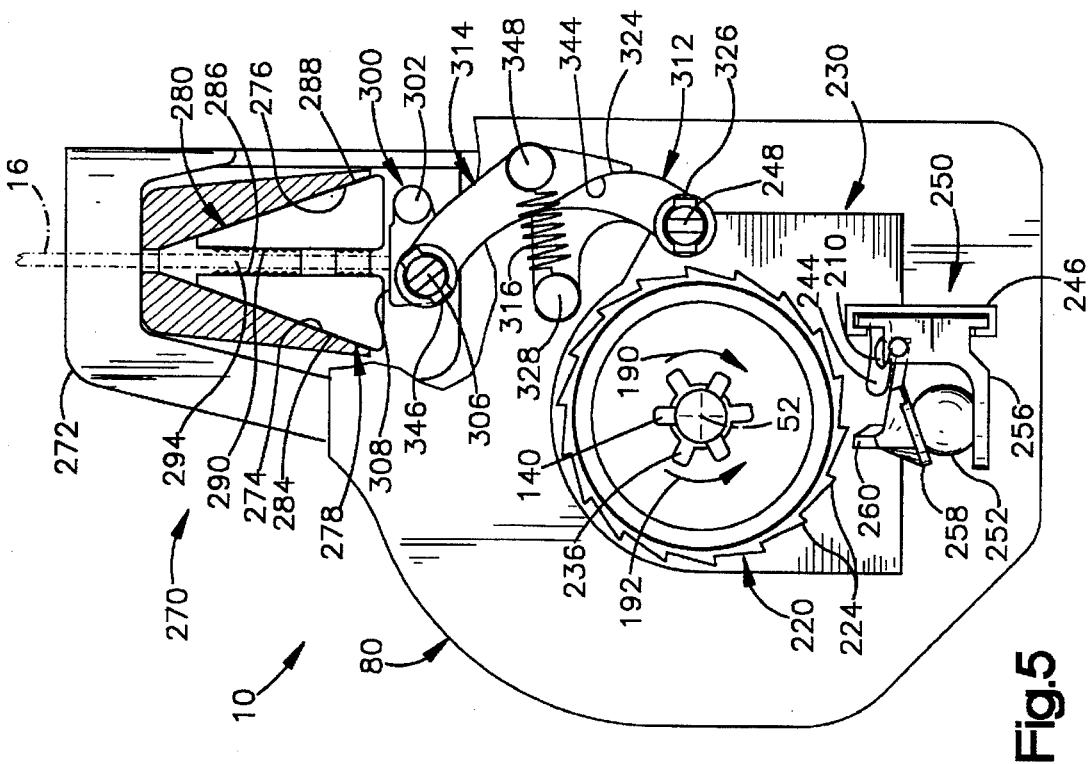
FIG. 5 is a schematic end view of parts of the retractor of FIG. 1 including a vehicle deceleration sensing mechanism and a primary belt locking mechanism shown in an unactuated condition.

The retractor 10 includes a primary belt locking mechanism which, in the preferred embodiment, is a belt webbing clamp assembly 270. The clamp assembly 270 includes a clamp housing 272 which is mounted in the clamp mechanism openings 66 and 76 of the frame 40 and which is fixedly connected with the frame. The clamp housing 272 has a planar first sliding surface 274 (FIG. 5). A planar second sliding surface 276 is presented toward, but at an angle to, the first sliding surface 274.

A pair of clamp members 278 and 280 are supported in a known manner between the sliding surfaces 274 and 276 for sliding movement relative to the housing 272. The first clamp member 278 is generally wedge-shaped in cross-sectional configuration. The first clamp member 278 has a planar sliding surface 284 in abutting engagement with the first sliding surface 274 on the clamp housing 272. The first clamp member 278 also has a planar clamping surface 286 with a plurality of teeth. The clamping surface 286 is inclined relative to the sliding surface 284.

The second clamp member 280 is similar in configuration to the first clamp member 278. The second clamp member 280 has a planar sliding surface 288 in abutting engagement with the second sliding surface 276 on the clamp housing 272. The second clamp member 280 has a planar clamping surface 290 facing in a direction toward the clamping surface 286 of the first clamp member 278. The clamping surface 290 is inclined to the sliding surface 288. A plurality of teeth are formed on the clamping surface 290 of the second clamp member 280. The clamp members 278 and 280, and particularly the clamping surfaces 286 and 290, define between them a belt webbing passage 294 through which the belt webbing 16 is movable when the spool 170 rotates in the belt retraction direction 190 and the belt withdrawal direction 192.

The clamp members 278 and 280 are connected in a known manner for providing simultaneous sliding movement of the clamp members relative to the housing 272. Thus, the clamp members 278 and 280 move in a direction toward or away from each other while they simultaneously slide (upward or downward as viewed in FIG. 5) relative to the housing 272. A return spring (not shown) biases the clamp members 278 and 280 outwardly away from each other and downward as viewed in FIG. 5, into an unactuated or released position shown in FIG. 5.

The clamp assembly 270 (FIG. 3) also includes an initiator 300 for effecting movement of the clamp members 278 and 280. At one end of the initiator 300, a cylindrical pivot pin 302 extends through the opening 66 in the frame side wall 46 and through the opening 90 in the sensor plate 80. A pivot pin 304 at the opposite end of the initiator 300 extends through the opening 76 in the frame side wall 44 and through the opening 158 in the spring plate 150. The pivot pins 302 and 304 support the initiator 300 for pivotal movement relative to the frame 40.

Figure 6:
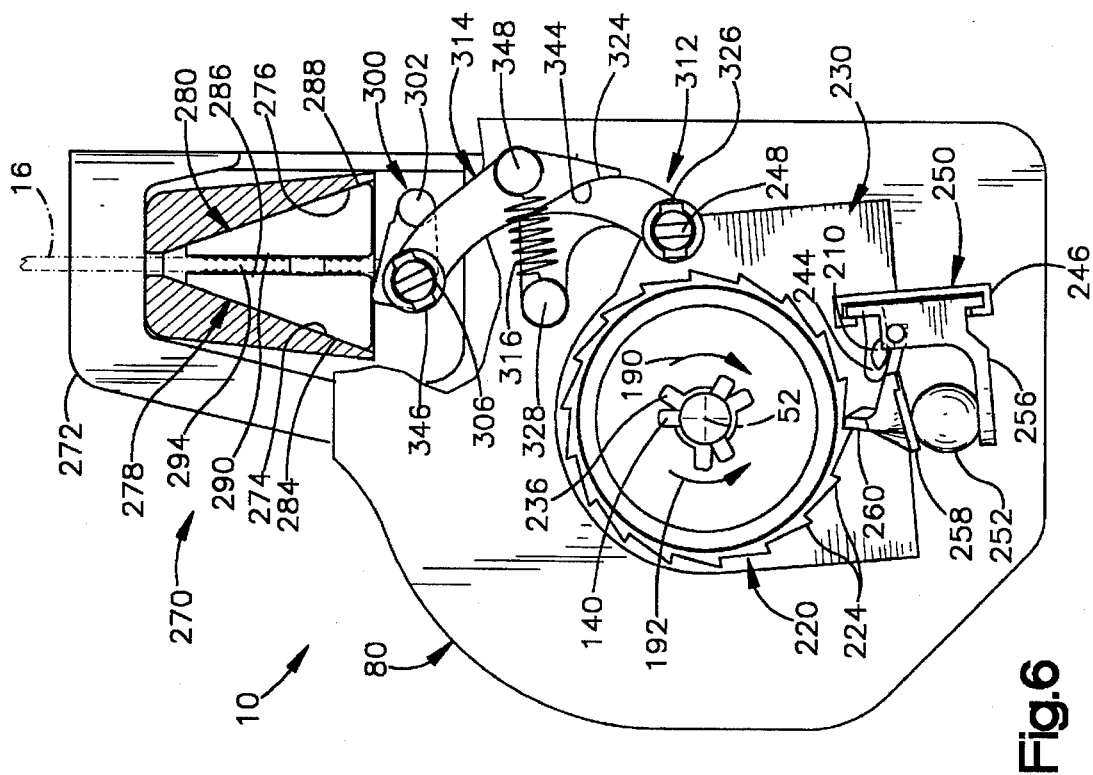
FIG. 6 is a view similar to FIG. 5 showing the vehicle deceleration sensing mechanism and the primary belt locking mechanism in an actuated condition.

The initiator 300 also has a link post 306 which extends through the opening 66 in the side wall 46 of the frame 40 and through the opening 92 in the sensor plate 80. An engagement surface 308 on the initiator 300 adjoins the first clamp member 278. The engagement surface 308 is engageable with the first clamp member 278, in a manner described below, to move the first clamp member, and thereby the second clamp member 280, to an actuated or engaged condition as shown in FIG. 6. The initiator 300 has a slot 309, adjacent to the engagement surface 308, through which the belt webbing 16 extends between the spool 170 and the belt webbing passage 294.

A link assembly 310 interconnects the actuator 230 and the clamp mechanism 270. The link assembly 310 includes a lower link arm 312, an upper link arm 314, and a link assembly spring 316.

The lower link arm 312 (FIG. 4) has a main body portion 320. An arcuate engagement surface 324 on the main body portion 320 of the lower link arm 312 is presented toward the upper link arm 314. A hub 326 at the lower end of the lower link arm 312 is snapped on the lower link arm pivot post 248 (FIGS. 4 and 5) of the actuator 230. The lower link arm 312 is thus supported for pivotal movement relative to the actuator 230. A spring support post on 328 is formed on a planar extension 330 of the lower link arm 312. The spring support post 328 projects axially from the lower link arm 312 in a direction away from the frame 40. A spring retainer rib 332 is formed on the spring support post 328.

The upper link arm 314 is similar in configuration to the lower link arm 312 and includes an arcuate main body portion 340. An arcuate engagement surface 344 on the main body portion 340 of the upper link arm 314 is presented toward the lower link arm 312. The engagement surface 344 on the upper link arm 314 is engageable in a force-transmitting relationship with the engagement surface 324 on the lower link arm 312 as shown in FIG. 5.

A hub 346 at the upper end of the upper link arm 314 is snapped on the link post 306 (FIG. 5) of the initiator 300. The upper link arm 314 is thereby supported for pivotal movement relative to the initiator 300. The upper link arm 314 further includes a spring support post 348 (FIG. 4) which projects axially in a direction away from the frame 40. A spring retainer rib 350 is formed on the spring support post 348.

The link assembly spring 316 is a tension spring having a first end portion 354 received on the spring support post 348 of the upper link arm 314 between the spring retainer rib 350 and the main body portion 340 of the upper link arm. A second end portion 356 of the link assembly spring 316 is received on the spring support post 328 of the lower link arm 312 between the spring retainer rib 332 and the main body portion 320 of the lower link arm. The link assembly spring 316 biases the upper link arm 314 and the lower link arm 312 toward each other, into a position as shown in FIG. 5.

FIG. 5 illustrates the position of the parts of the retractor 10 when the vehicle in which the retractor is mounted is not experiencing deceleration above a predetermined deceleration. The inertia mass 252 rests at the bottom of the cavity 254 in the sensor housing 256. The tooth 260 on the sensor lever 258 is spaced from the pilot ratchet teeth 224 on the pilot ratchet 220. The actuator 230 is in a first position of rotation, about the primary axis 52 of the retractor 10, as shown in FIG. 5. The first and second clamp members 278 and 280 are spaced apart from each other, and the belt webbing 16 is movable through the passage 294 between the first and second clamp members.

The lock pawl 200 is in a position spaced apart from the ratchet teeth 180 on the spool locking ratchet wheels 178 on the spool 170. The ratchet teeth 180 (seen also in FIG. 7) on the spool locking ratchet wheels 178 are spaced apart from and are rotatable relative to the fixed teeth 60 and 70 on the frame side walls 46 and 44, respectively. The connector portions 114 (FIG. 9) on the sensor plate 80 and the connector portions on the spring plate 150 are unbroken. The hub 102 on the sensor plate 80 and the hub 162 on the spring plate 150 are concentric with the primary axis 52 of the retractor 10. The spool axis 176 is coincident with the primary axis 52 of the retractor 10 and the spool 170 is supported for rotation about the primary axis of the retractor.

In the event of a vehicle emergency situation such as vehicle deceleration above a predetermined deceleration, the inertia mass 252 moves relative to the sensor housing 256. The sensor lever 258 pivots upward from the position shown in FIG. 5 to the position shown in FIG. 6. The tooth 260 on the sensor lever 258 moves into engagement with the pilot ratchet 220. Rotation of the spool 170 and the pilot ratchet 220 in the belt withdrawal direction 192 causes the next available ratchet tooth 224 on the pilot ratchet to engage the sensor lever 258.

Thereafter, the sensor lever 258 transmits rotational force from the pilot ratchet 220 through the sensor housing 256 to the actuator 230. This rotational force causes the actuator 230 to pivot or rotate in a counterclockwise direction (as viewed in FIGS. 5 and 6) about the primary axis 52 of the retractor 10. The actuator 230 moves from the first position shown in FIG. 5 to a second position as shown in FIG. 6. In a preferred embodiment of the invention, the actuator rotates approximately 16° about the primary axis 52 between the first position and the second position.

As the actuator 230 rotates, the lower link arm support post 248 on the actuator moves in an arcuate path centered on the primary axis 52. This arcuate movement of the support post 248 causes the hub 326 on the lower link arm 312 to move in the same arcuate path. Because the link assembly spring 316 is holding the engagement surface 344 of the upper link arm 314 against the engagement surface 324 of the lower link arm 312, the force of the moving lower link arm is transmitted to the upper link arm. Because of the pivot connections at the hubs 326 and 346 of the lower and upper link arms 312 and 314, respectively, and because the initiator 300 is itself supported for pivotal movement on the frame 40, the hub of the upper link arm moves in a direction so as to pivot the initiator from the unactuated position shown in FIG. 5 to the actuated condition shown in FIG. 6.

The engagement surface 308 on the initiator 300 moves generally upward as viewed in FIGS. 5 and 6. The upward movement of the engagement surface 308 results in upward movement of the first clamp member 278 and, thereby, of the second clamp member 280. The sliding surface 284 on the first clamp member 278 slides along the first sliding surface 274 on the clamp housing 272. The sliding surface 288 on the second clamp member 280 slides along the second sliding surface 276 on the clamp housing 272. The clamp members 278 and 280 move upward and also move toward each other, partially closing the belt webbing passage 294. The clamping surface 286 on the first clamp member 278 and the clamping surface 290 on the second clamp member 280 engage opposite sides of the belt webbing 16. The teeth of the clamp members 278 and 280, respectively, dig into the material of the belt webbing 16. The webbing clamp assembly 270 is in the engaged condition shown in FIG. 6.

Movement of the belt webbing 16 upward as viewed in FIG. 6, that is, out of the retractor 10, pulls the clamp members 278 and 280 closer toward each other and tightens the belt webbing clamp assembly 270. This places the webbing clamp assembly 270 in a clamping condition and blocks withdrawal of the belt webbing 16 from the spool 170 and the retractor 10, restraining forward movement of the vehicle occupant.

Figure 7:
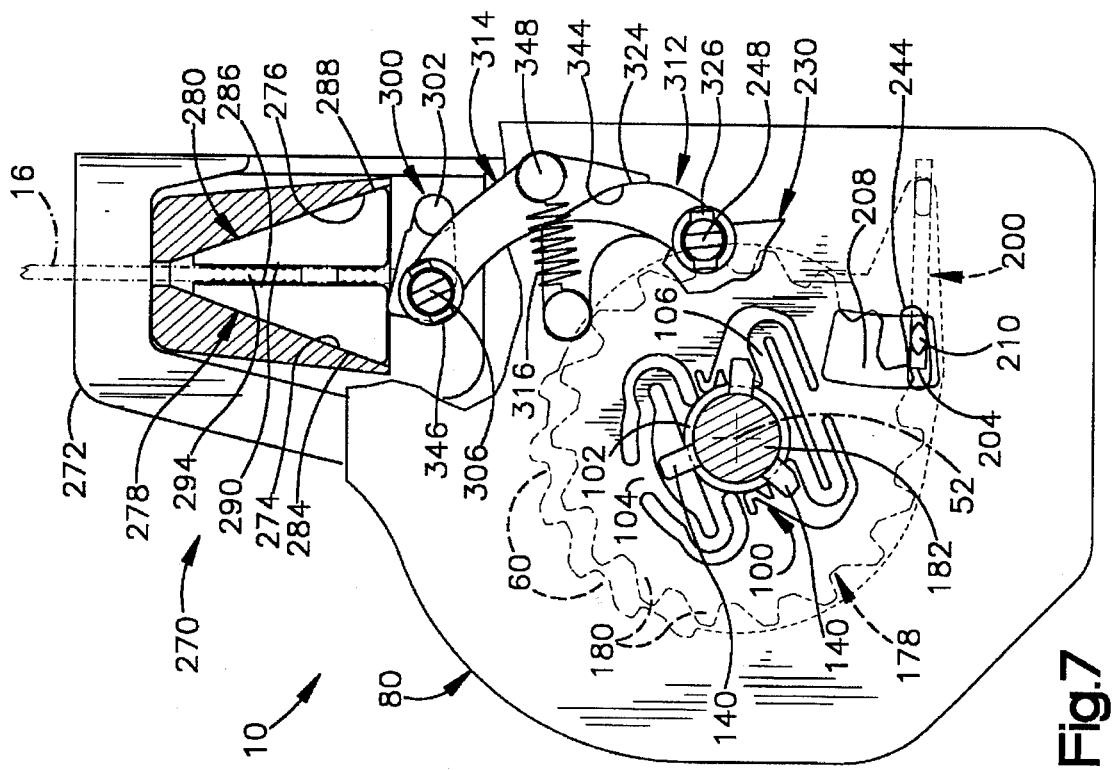
FIG. 7 is a view similar to FIG. 6 showing other parts of the retractor of FIG. 1 including a secondary belt locking mechanism in an unactuated condition.
Figure 9:
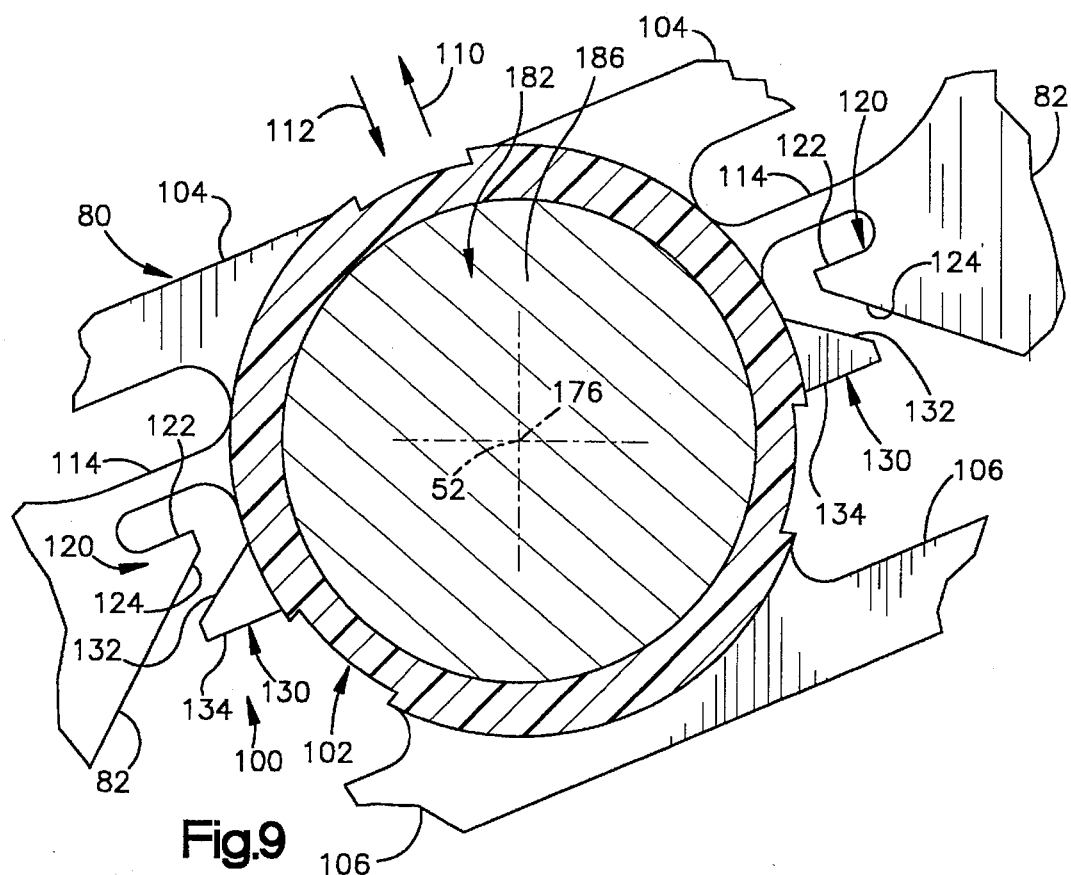
FIG. 9 is an enlarged view of a portion of the secondary belt locking mechanism shown in the unactuated condition.

FIGS. 7 and 9 illustrate the position of other parts of the retractor 10 when the belt webbing clamp assembly 270 is in the engaged condition shown in FIG. 6. The connector portions 114 (FIG. 9) of the sensor plate 80, as well as the connector portions of the spring plate 150, remain unbroken. The hub 102 of the sensor plate 80 and the hub 162 of the spring plate 150 remain centered on the primary axis 52 of the retractor 10. The spool 170 remains in a position in which the spool axis 176 is coincident with the primary axis 52 of the retractor 10. The ratchet teeth 180 on the spool locking ratchet wheels 178 remain spaced apart from the fixed teeth 60 and 70 on the frame 40.

Upon the cessation of vehicle deceleration above the predetermined deceleration, the vehicle deceleration sensing assembly 250 returns to the unactuated condition shown in FIG. 5. The actuator return spring (not shown) moves the actuator 230 back to the first position shown in FIG. 5. The initiator 300 and the link arms 312 and 314 move back to the unactuated condition shown in FIG. 5. Upon the release of tensile forces on the belt webbing 16, the clamp members 278 and 280 move back to the released condition shown in FIG. 5. The belt webbing 16 is freely movable through the passage 294 in the belt webbing clamp assembly 270.

When the actuator 230 pivots between the first position shown in FIG. 5 and the second position shown in FIG. 6, the surfaces defining the cam slot 244 in the actuator move relative to the cam tab 210 of the lock pawl 200. The lock pawl 200 is piloted toward a position in engagement with the spool locking ratchet wheels 178. However, the dimensions of the cam slot 244 are selected so that the actuator 230 must rotate approximately 20° about the primary axis 52 in order to cam the lock pawl 200 into engagement with the spool locking ratchet wheels 178, while the belt webbing clamp assembly 270 attains the engaged condition after only about 16° of rotation of the actuator. Thus, the lock pawl 200 does not normally move into the path of rotation of the ratchet teeth.180 on the spool locking ratchet wheels 178 when the clamp assembly 270 attains the engaged condition shown in FIG. 6. As a result, the belt webbing clamp assembly 270 normally blocks withdrawal of belt webbing 16 from the retractor 10, thus stopping rotation of the spool 170, prior to the lock pawl 200 engaging the spool locking ratchet wheels 178.

Figure 8:
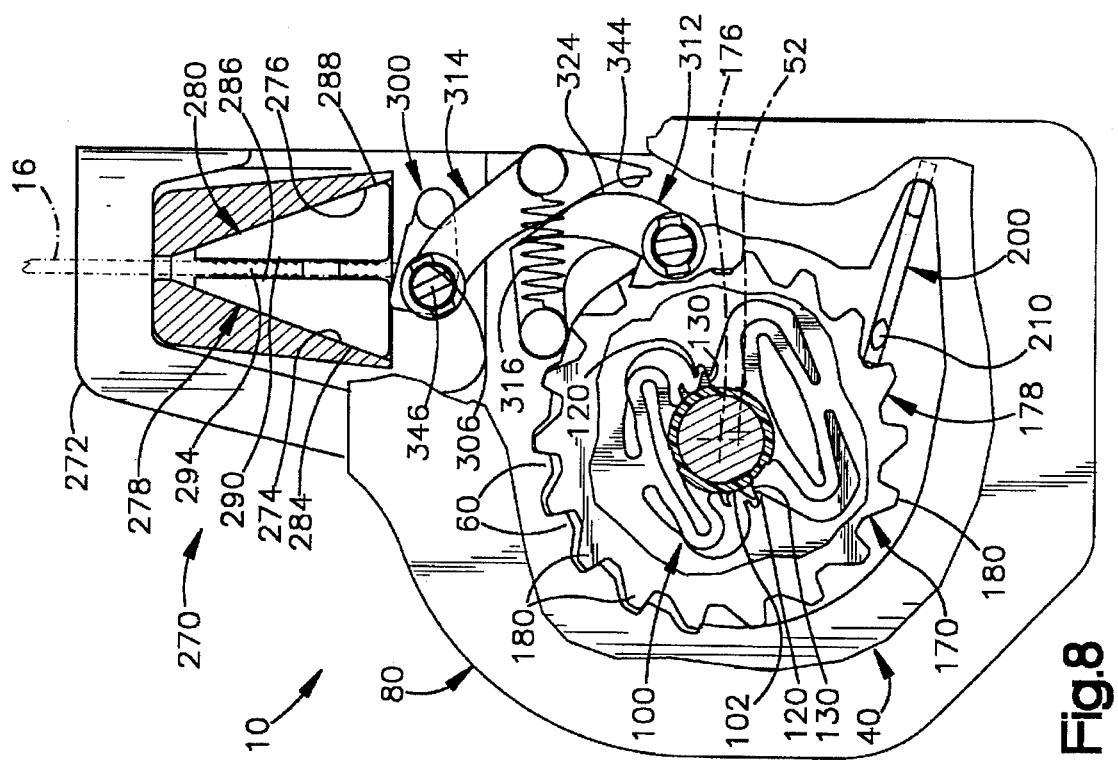
FIG. 8 is a view similar to FIG. 7 showing the secondary belt locking mechanism in an actuated condition.

In some circumstances, such as when an extraordinary tensile force is placed on the belt webbing 16, it is possible that the belt webbing may slip through the passage 294 between the clamp members 278 and 280. In such circumstances, the clamp assembly 270, even though in the engaged condition shown in FIG. 6, does not block withdrawal of belt webbing 16 from the spool 170. The tensile force on the belt webbing 16 causes the spool 170 to continue to rotate in the belt withdrawal direction 192. The pilot ratchet 220 and thus the actuator 230 continue to rotate in the belt withdrawal direction 192. The actuator 230 rotates about 420 farther, past the second position shown in FIGS. 6 and 7 and into a third position as shown in FIG. 8. This extra rotational movement of the actuator 230 actuates a secondary belt locking mechanism of the retractor 10, as follows.

As the actuator 230 rotates from the second position to the third position, the surfaces defining the cam slot 244 on the actuator 230 lift the cam tab 210 of the lock pawl 200 so that the locking arms 202 and 204 of the lock pawl engage the ratchet teeth 180 on the spool locking ratchet wheels 178. Because the spool 170 is supported on the movable hubs 102 and 162 of the sensor plate 80 and the spring plate 150, respectively, the force exerted by the belt webbing 16 on the spool does not then result in the lock pawl 200 blocking rotation of the spool. Instead, the spool 170 shifts or moves radially, in the first direction 110. The spool axis 176 moves in the first direction 110 away from the primary axis 52. The ratchet teeth 180 on the spool locking ratchet wheels 178 on the spool 170 engage the fixed teeth 60 and 70 on the side walls 46 and 44, respectively, of the frame 40. The spool 170 is thereby blocked from rotation in the belt withdrawal direction 192. Thus, the secondary belt locking mechanism blocks withdrawal of belt webbing 16 from the retractor 10, even though the primary belt locking mechanism, the belt webbing clamp assembly 270, is not in a clamping condition blocking withdrawal of the belt webbing from the retractor. As a result, the vehicle occupant is restrained.

Figure 10:
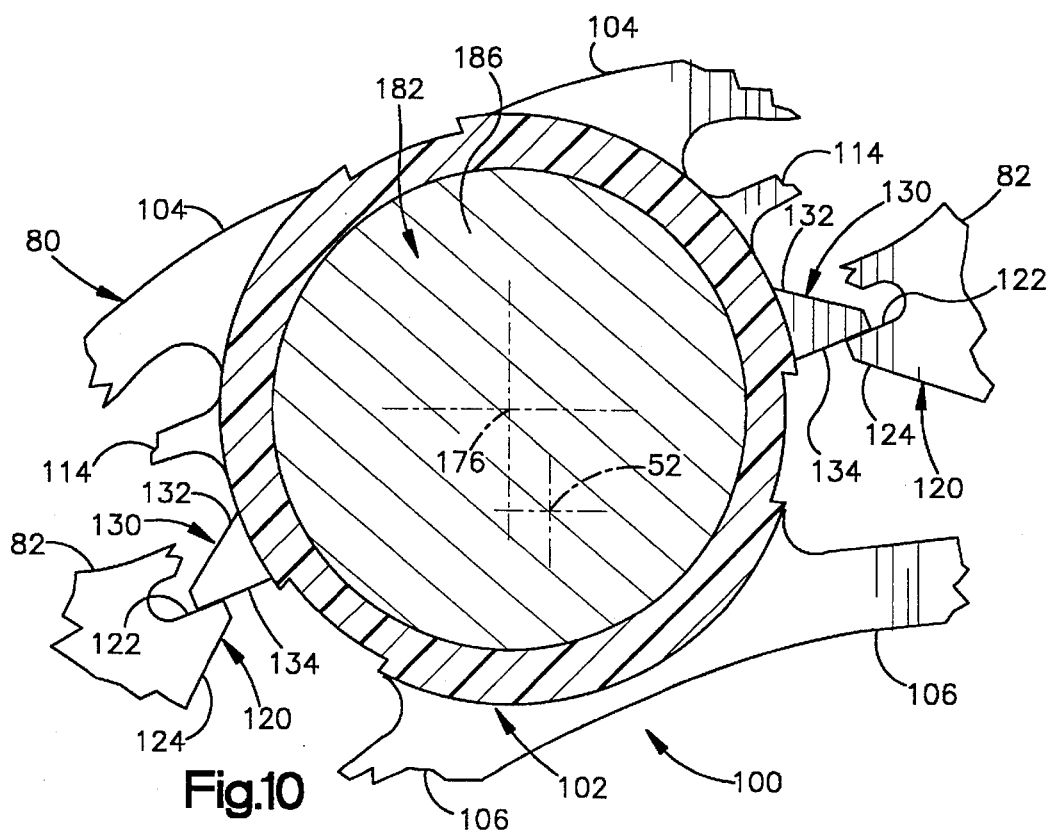
FIG. 10 is a view similar to FIG. 9 of the portion of the secondary belt locking mechanism shown in the actuated condition.

After the spool 170 moves from the position shown in FIG. 7 to the locked position shown in FIG. 8, the sensor plate 80 and the spring plate 150 retain the spool in the locked position, even after termination of a vehicle emergency such as the sudden vehicle deceleration. Specifically, when the spool 170 moves to the locked position shown in FIG. 8, the second end portion 186 of the shaft 182 moves the hub 102 on the sensor plate 80, in the first direction 110, relative to the main wall portion 82 of the sensor plate. The connector portions 114 on the sensor plate 80 break as shown in FIG. 10. The barbs 130 on the sensor plate 80 move in the first direction 110 and engage the blocking members 120 on the sensor plate. The cam surfaces 132 on the barbs 130 engage the cam surfaces 124 on the blocking members 120, and the moving barbs cam the blocking members radially outward. The barbs 130 move in the first direction 110 past the blocking members 120. The resilience of the bearing section 100 of the sensor plate 180 thereafter causes the blocking members 120 to move radially inward to a position, as shown in FIG. 10, blocking movement of the barbs 130 back to their original position as shown in FIG. 9. Specifically, the blocking surfaces 122 on the blocking members 120 engage the blocking surfaces 134 on the barbs 130 to block movement of the barbs. Because the barbs 130 are connected for movement with the hub 102, the blocking members 120 thus block movement of the hub 102 and of the second end portion 186 of the shaft 182 back to their original position centered on the primary axis 52 of the retractor 10.

At the same time as the parts of the sensor plate 80 are assuming the condition shown in FIGS. 8 and 10, the first end portion 184 (FIG. 2) of the shaft 182 moves the hub 162 on the spring plate 150, in the first direction 110, relative to the main wall portion 152 of the spring plate. The connector portions 164 on the spring plate 150 break. The barbs 168 on the spring plate 150 move, in the first direction 110, past the blocking members 166 on the spring plate. The blocking members 166 thereafter move radially inward to a position blocking movement of the barbs 168 back to their original position. Because the barbs 168 are connected for movement with the hub 162 of the spring plate 150, the blocking members 166 thus block movement of the hub 162 and of the first end portion 184 of the shaft 172 back to their original position centered on the primary axis 52 of the retractor 10.

Accordingly, the shaft 172 and thereby the spool 170 are blocked from movement back to their original position in which the spool axis 176 is coincident with the primary axis 52 of the retractor 10. The spool 170 is thus retained in its shifted or locked position in which the ratchet teeth 180 on the spool locking ratchet wheels 178 are engaged with the fixed teeth 60 and 70 on the side walls 46 and 44, respectively, of the frame 40. Thus, the spool 170 continues to be blocked from rotation in the belt withdrawal direction 192. The occupant continues to be restrained by the vehicle seat belt system 12 and it is evident that the spool 170 has shifted and that the retractor 10 should be repaired or replaced.

From the above description of the invention, those skilled in the art will perceive improvements, changes and modifications in the invention. For example, the retractor 10 may include a webbing acceleration sensitive mechanism (not shown) for effecting rotation of the actuator 230 in the event of rotation of the spool 120 in the belt withdrawal direction 192 at a rate exceeding a predetermined rate of rotation. The retractor 10 may also include a cinch mechanism or automatic locking mechanism. Such improvements, changes and modifications within the skill of the art are intended to be covered by the appended claims.

Having described the invention, I claim:

1. A seat belt retractor comprising:

a length of seat belt webbing which is extensible about a vehicle occupant to restrain the vehicle occupant;

a spool on which said belt webbing is wound, said spool being rotatable in a belt retraction direction and in an opposite belt withdrawal direction;

sensing means for sensing a vehicle emergency situation;

a primary belt locking mechanism for blocking withdrawal of belt webbing from said spool in response to said sensing means sensing an emergency situation;

a secondary belt locking mechanism having an actuated condition for blocking withdrawal of belt webbing from said spool and having an unactuated condition;

said secondary belt locking mechanism being actuated in the event of inability of said primary belt locking mechanism to block withdrawal of said belt webbing from said spool;

means for retaining said secondary belt locking mechanism in the actuated condition after termination of said emergency situation; and an actuator which is rotatable in response to said sensing means sensing an emergency situation;

said primary belt locking mechanism comprising a belt webbing clamp mechanism which is actuatable in response to a first predetermined amount of rotation of said actuator;

said secondary belt locking mechanism comprising a ratchet which is rotatable with said spool and a lock pawl which is engageable with said ratchet;

said lock pawl being movable by said actuator into engagement with said ratchet to actuate said secondary belt locking mechanism in response to a second predetermined amount of rotation of said actuator which is greater than said first predetermined amount of rotation of said actuator.

2. A seat belt retractor as set forth in claim 1 wherein:

said retractor has a primary axis;

said spool has a spool axis which is movable with said spool;

said retractor includes bearing means for supporting said spool and said ratchet for rotation in a first position in which said spool axis is coincident with said primary axis of said retractor;

said bearing means including means for supporting said spool and said ratchet for movement, in the event of inability of said primary belt locking mechanism to block withdrawal of said belt webbing from said spool, from said first position to a second position in which said spool axis is not coincident with said primary axis of said retractor;

said secondary belt locking mechanism further comprising a set of fixed teeth;

said ratchet on said spool being engageable with said fixed teeth, upon movement of said spool from the first position to the second position, to block rotation of said spool and thereby to block withdrawal of said belt webbing from said spool.

3. A seat belt retractor as set forth in claim 2 wherein said means for retaining said secondary belt locking mechanism in the actuated condition comprises:

a first portion of said bearing means fixed in position relative to said fixed teeth, and a second portion of said bearing means fixed for movement with said spool from the first position to the second position, said first portion of said bearing means thereafter blocking movement of said second portion of said bearing means from the second position to the first position to retain said second portion of said bearing means and said spool in the second position.

4. A seat belt retractor comprising:

a length of seat belt webbing which is extensible about a vehicle occupant to restrain the vehicle occupant;

a frame;

a spool on which said belt webbing is wound, said spool being rotatable in a belt retraction direction and in an opposite belt withdrawal direction, said spool having a spool axis which is movable with said spool;

said retractor having a primary axis which is fixed in position relative to said frame;

sensing means for sensing a vehicle emergency situation;

an actuator which is rotatable relative to said frame in response to said sensing means sensing an emergency situation;

a primary belt locking mechanism comprising a belt webbing clamp mechanism which is actuatable in response to a first predetermined amount of rotation of said actuator for blocking withdrawal of belt webbing from said spool;

a secondary belt locking mechanism comprising a ratchet which is rotatable with said spool and a lock pawl which is engageable with said ratchet, said secondary belt locking mechanism having an actuated condition for blocking withdrawal of belt webbing from said spool and having an unactuated condition;

bearing means for supporting said spool and said ratchet on said frame for rotation in a first position in which said spool axis is coincident with said primary axis of said retractor;

said bearing means including means for supporting said spool and said ratchet for movement relative to said frame, in response to a second predetermined amount of rotation of said actuator which is greater than said first predetermined amount of rotation of said actuator, from said first position to a second position in which said spool axis is not coincident with said primary axis of said retractor;

said secondary belt locking mechanism further comprising a set of fixed teeth;

said ratchet on said spool being engageable with said fixed teeth on said frame, upon movement of said spool from the first position to the second position, to block rotation of said spool and thereby to block withdrawal of said belt webbing from said spool; and means for retaining said ratchet on said spool in engagement with said fixed teeth on said frame after termination of said emergency situation.

5. A seat belt retractor as set forth in claim 4 wherein said bearing means comprises a pair of hubs in which said spool is journalled for rotation and frangible connector portions supporting said hubs in the first position, said connector portions breaking upon movement of said spool from the first position to the second position;

said means for retaining comprising barbs fixed for movement with said hubs from the first position to the second position and blocking members blocking movement of said barbs from the second position to the first position to retain said barbs and said hubs and said spool in the second position.

6. A seat belt retractor as set forth in claim 5 wherein each one of said barbs is associated with a respective one of said blocking members, each one of said barbs having a cam surface and a blocking surface, each one of said blocking members having a cam surface and a blocking surface, said cam surfaces on said barbs being engageable with said cam surfaces on said blocking members to cam said blocking members radially outwardly upon movement of said barbs past said blocking members in a first direction from the first position to the second position, said blocking surfaces on said barbs being engageable with said blocking surfaces on said blocking members to block movement of said cams past said blocking members in a second direction opposite to the first direction to retain said barbs in the second position.

7. A seat belt retractor comprising:

a length of seat belt webbing which is extensible about a vehicle occupant to restrain the vehicle occupant;

a spool on which said belt webbing is wound, said spool being rotatable in a belt retraction direction and in an opposite belt withdrawal direction;

sensing means for sensing a vehicle emergency situation;

a primary belt locking mechanism for blocking withdrawal of belt webbing from said spool in response to said sensing means sensing an emergency situation;

a secondary belt locking mechanism having an actuated condition for blocking withdrawal of belt webbing from said spool and having an unactuated condition;

said secondary belt locking mechanism being actuated in the event of inability of said primary belt locking mechanism to block withdrawal of said belt webbing from said spool; and means for retaining said secondary belt locking mechanism in the actuated condition after termination of said emergency situation;

wherein said secondary belt locking mechanism comprises means for supporting said spool for movement from a first position to a second position and means for blocking rotation of said spool in the belt withdrawal direction when said spool is in the second position, said means for retaining said secondary belt locking mechanism in the actuated condition comprising means for blocking movement of said spool from the second position to the first position after termination of said vehicle emergency situation;

wherein said means for retaining said spool in the second position comprises a fixed member and a movable member which is fixed for movement with said spool from the first position to the second position, said fixed member thereafter blocking movement of said movable member from the second position to the first position to retain said second member and said spool in the second position; and including at least one support member having a hub supporting said spool for rotation, said hub being movable with said spool from the first position to the second position, said support member including said movable member, said movable member being connected with said hub for movement from the first position to the second position.

8. A seat belt retractor as set forth in claim 7 wherein said movable member comprises a barb on said hub and said fixed member comprises a blocking member on said support member, said barb being movable in a first direction past said blocking member upon movement of said hub from the first position to the second position, said blocking member blocking movement of said barb in a second direction opposite to said first direction thereby to block movement of said hub from the second position to the first position.

9. A seat belt retractor comprising:

a length of seat belt webbing which is extensible about a vehicle occupant to restrain the vehicle occupant;

a spool on which said belt webbing is wound, said spool being rotatable in a belt retraction direction and in an opposite belt withdrawal direction;

sensing means for sensing a vehicle emergency situation;

a primary belt locking mechanism for blocking withdrawal of belt webbing from said spool in response to said sensing means sensing an emergency situation;

bearing means for supporting said spool in a first position for rotation about a primary axis of said retractor;

said bearing means including means for supporting said spool for movement away from said primary axis from said first position to a second position, in the event of inability of said primary belt locking mechanism to block withdrawal of said belt webbing from said spool in an emergency situation;

means for blocking rotation of said spool in the belt withdrawal direction when said spool is in the second position; and means for retaining said spool in the second position after termination of the emergency situation;

wherein said bearing means comprises:

a pair of hubs in which said spool is journalled for rotation;

frangible connector portions connected with said hubs and supporting said spool and said hubs in the first position, said connector portions breaking upon movement of said spool from the first position to the second position;

barbs fixed for movement with said hubs from the first position to the second position; and blocking members engageable with said barbs for thereafter blocking movement of said barbs from the second position to the first position to retain said barbs and said hubs and said spool in the second position.

10. A seat belt retractor as set forth in claim 9 wherein each one of said barbs is associated with a respective one of said blocking members, each one of said barbs having a cam surface and a blocking surface, each one of said blocking members having a cam surface and a blocking surface, said cam surfaces on said barbs being engageable with said cam surfaces on said blocking members to cam said blocking members radially outwardly upon movement of said barbs past said blocking members in a first direction from the first position to the second position, said blocking surfaces on said barbs being engageable with said blocking surfaces on said blocking members to block movement of said cams past said blocking members in a second direction opposite to the first direction to retain said barbs in the second position.

11. A seat belt retractor comprising:

a length of seat belt webbing which is extensible about a vehicle occupant to restrain the vehicle occupant;

a spool on which said belt webbing is wound, said spool being rotatable in a belt retraction direction and in an opposite belt withdrawal direction;

sensing means for sensing a vehicle emergency situation;

a primary belt locking mechanism for blocking withdrawal of belt webbing from said spool in response to said sensing means sensing an emergency situation;

bearing means for supporting said spool in a first position for rotation about a primary axis of said retractor;

said bearing means including means for supporting said spool for movement away from said primary axis from said first position to a second position, in the event of inability of said primary belt locking mechanism to block withdrawal of said belt webbing from said spool in an emergency situation;

means for blocking rotation of said spool in the belt withdrawal direction when said spool is in the second position;

means for retaining said spool in the second position after termination of the emergency situation; and an actuator which is rotatable in response to said sensing means sensing an emergency situation;

said primary belt locking mechanism comprising a belt webbing clamp mechanism which is actuatable in response to a first predetermined amount of rotation of said actuator;

said means for blocking rotation of said spool in the belt withdrawal direction when said spool is in the second position comprising a ratchet which is rotatable with said spool and a lock pawl which is engageable with said ratchet;

said lock pawl being movable by said actuator into engagement with said ratchet to actuate said secondary belt locking mechanism in response to a second predetermined amount of rotation of said actuator which is greater than said first predetermined amount of rotation of said actuator.

12. A seat belt retractor comprising:

a length of seat belt webbing which is extensible about a vehicle occupant to restrain the vehicle occupant;

a spool on which said belt webbing is wound, said spool being rotatable in a belt retraction direction and in an opposite belt withdrawal direction;

sensing means for sensing a vehicle emergency situation;

a primary belt locking mechanism for blocking withdrawal of belt webbing from said spool in response to said sensing means sensing an emergency situation;

a secondary belt locking mechanism having an actuated condition for blocking withdrawal of belt webbing from said spool and having an unactuated condition;

said secondary belt locking mechanism being actuated in the event of inability of said primary belt locking mechanism to block withdrawal of said belt webbing from said spool; and means for retaining said secondary belt locking mechanism in the actuated condition after termination of said emergency situation;

wherein said secondary belt locking mechanism comprises means for supporting said spool for movement from a first position to a second position and means for blocking rotation of said spool in the belt withdrawal direction when said spool is in the second position, said means for retaining said secondary belt locking mechanism in the actuated condition-comprising means for blocking movement of said spool from the second position to the first position after termination of said vehicle emergency situation;

wherein said means for supporting said spool for movement from a first position to a second position comprises members which are made from a resilient material and which block movement of the spool from the second position to the first position.

13. A seat belt retractor as set forth in claim 12 wherein said means for retaining said spool in the second position comprises:

a fixed member; and a movable member which is fixed for movement with said spool from the first position to the second position, said fixed member thereafter blocking movement of said movable member from the second position to the first position to retain said second member and said spool in the second position.

14. A seat belt retractor comprising:

a length of seat belt webbing which is extensible about a vehicle occupant to restrain the vehicle occupant;

a spool on which said belt webbing is wound, said spool being rotatable in a belt retraction direction and in an opposite belt withdrawal direction;

sensing means for sensing a vehicle emergency situation;

a primary belt locking mechanism for blocking withdrawal of belt webbing from said spool in response to said sensing means sensing an emergency situation;

a secondary belt locking mechanism having an actuated condition for blocking withdrawal of belt webbing from said spool and having an unactuated condition;

said secondary belt locking mechanism being actuated in the event of inability of said primary belt locking mechanism to block withdrawal of said belt webbing from said spool;

means for retaining said secondary belt locking mechanism in the actuated condition after termination of said emergency situation;

said retractor including a frame and a pair of plates which are fixed to said frame and which support said spool for rotation relative to said frame in the belt retraction direction and in the belt withdrawal direction, each one of said plates including a frangible portion which breaks upon actuation of said secondary belt locking mechanism, said means for retaining said secondary belt locking mechanism in the actuated condition comprising interlocking portions on each one of said plates which move from a disengaged condition to an engaged condition upon actuation of said secondary belt locking mechanism to retain said secondary belt locking mechanism in the actuated condition after termination of said emergency situation.

15. A seat belt retractor as set forth in claim 14 wherein said frame includes a series of fixed teeth which are engageable by a ratchet on said spool to block rotation of said spool in the belt withdrawal direction upon actuation of said secondary belt locking mechanism, said spool moving radially in the event of inability of said primary belt locking mechanism to block withdrawal of said belt webbing from said spool to enable movement of said ratchet into engagement with said fixed teeth.

16. A seat belt retractor comprising:

a length of seat belt webbing which is extensible about a vehicle occupant to restrain the vehicle occupant;

a spool on which said belt webbing is wound, said spool being rotatable in a belt retraction direction and in an opposite belt withdrawal direction;

sensing means for sensing a vehicle emergency situation;

a primary belt locking mechanism for blocking withdrawal of belt webbing from said spool in response to said sensing means sensing an emergency situation;

bearing means for supporting said spool in a first position for rotation about a primary axis of said retractor;

said bearing means including means for supporting said spool for movement away from said primary axis from said first position to a second position, in the event of inability of said primary belt locking mechanism to block withdrawal of said belt webbing from said spool in an emergency situation;

means for blocking rotation of said spool in the belt withdrawal direction when said spool is in the second position;

means for retaining said spool in the second position after termination of the emergency situation;

said retractor comprising a frame and a pair of plates which are fixed to said frame and which support said spool for rotation relative to said frame in the belt retraction direction and in the belt withdrawal direction, said plates including said bearing means, each one of said plates being made from a resilient material and including a frangible connector portion which breaks upon actuation of said secondary belt locking mechanism, said means for retaining said secondary belt locking mechanism in the actuated condition comprising blocking portions on said resilient plates which retain said secondary belt locking mechanism in the actuated condition after termination of said emergency situation.

17. A seat belt retractor comprising:

a length of seat belt webbing which is extensible about a vehicle occupant to restrain the vehicle occupant;

a spool on which said belt webbing is wound, said spool being rotatable in a belt retraction direction and in an opposite belt withdrawal direction;

sensing means for sensing a vehicle emergency situation;

a primary belt locking mechanism for blocking withdrawal of belt webbing from said spool in response to said sensing means sensing an emergency situation;

bearing means for supporting said spool in a first position for rotation about a primary axis of said retractor;

said bearing means including means for supporting said spool for movement away from said primary axis from said first position to a second position, in the event of inability of said primary belt locking mechanism to block withdrawal of said belt webbing from said spool in an emergency situation;

means for blocking rotation of said spool in the belt withdrawal direction when said spool is in the second position;

means for retaining said spool in the second position after termination of the emergency situation;

said spool having a spool axis which is movable with said spool;

said bearing means supporting said spool and said ratchet for rotation in a condition in which said spool axis is coincident with said primary axis of said retractor when said spool is in the first position;

said bearing means supporting said spool and said ratchet in a condition in which said spool axis is not coincident with said primary axis of said retractor when said spool is in the second position;

said secondary belt locking mechanism further comprising a set of fixed teeth;

said ratchet on said spool being engageable with said fixed teeth, upon movement of said spool from the first position to the second position, to block rotation of said spool and thereby to block withdrawal of said belt webbing from said spool;

said means for retaining said spool in the second position after termination of the emergency situation comprising interlocking members which move from a disengaged condition to an engaged condition upon movement of said spool to the second position to retain said spool in the second position after termination of said emergency situation.

* * * * *